US011183885B2

United States Patent
Lee et al.

(10) Patent No.: US 11,183,885 B2
(45) Date of Patent: Nov. 23, 2021

(54) WIRELESS POWER TRANSMISSION DEVICE AND CONTROL METHOD THEREOF

(71) Applicant: SAMSUNG ELECTRONICS CO., LTD., Suwon-si (KR)

(72) Inventors: Chong-Min Lee, Seoul (KR); Sung-Bum Park, Suwon-si (KR); Jae-Hyun Park, Suwon-si (KR); Young-Ho Ryu, Yongin-si (KR); Kyung-Woo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 919 days.

(21) Appl. No.: 15/590,100

(22) Filed: May 9, 2017

(65) Prior Publication Data

US 2017/0331332 A1     Nov. 16, 2017

Related U.S. Application Data

(60) Provisional application No. 62/336,088, filed on May 13, 2016.

(30) Foreign Application Priority Data

Nov. 2, 2016     (KR) .......................... 10-2016-0145039

(51) Int. Cl.
*H02J 50/20*     (2016.01)
*H02J 50/23*     (2016.01)
(Continued)

(52) U.S. Cl.
CPC ............... *H02J 50/20* (2016.02); *H01Q 3/28* (2013.01); *H01Q 3/36* (2013.01); *H01Q 9/0407* (2013.01);
(Continued)

(58) Field of Classification Search
CPC .. H02J 50/20; H02J 50/80; H02J 50/90; H02J 7/02; H02J 50/23; H02J 50/10;
(Continued)

(56) References Cited

U.S. PATENT DOCUMENTS 6,816,115 B1 * 11/2004 Redi .................... H04B 7/0608
                                                          342/367
8,098,752 B2 *  1/2012 Hwang ................. H04L 1/0618
                                                          375/260
(Continued)

FOREIGN PATENT DOCUMENTS

CA        2957903      2/2016
KR    10-2013-0073861      7/2013
(Continued)

OTHER PUBLICATIONS

U.S.NRC, Definition of "nameplate capacity" p. 1 (Year: 2010).*
(Continued)

*Primary Examiner* — Pinping Sun
(74) *Attorney, Agent, or Firm* — Nixon & Vanderhye P.C.

(57) ABSTRACT

Disclosed are a wireless power transmission device and a control method thereof. The wireless power transmission device includes a communication circuit that receives information transmitted by an electronic device that receives wireless power; an array antenna including multiple cells that radiate wireless power; and a controller that receives the information transmitted by the electronic device through the communication circuit, combines cells of the multiple cells included in the array antenna based on the information and creates a group of cells corresponding to the electronic device, and controls the cells included in the group to radiate the wireless power towards the electronic device.

20 Claims, 11 Drawing Sheets

(51) Int. Cl.
    *H02J 50/10*         (2016.01)
    *H02J 7/02*          (2016.01)
    *H02J 50/40*         (2016.01)
    *H02J 50/80*         (2016.01)
    *H02J 50/90*         (2016.01)
    *H01Q 3/28*         (2006.01)
    *H01Q 3/36*         (2006.01)
    *H01Q 9/04*         (2006.01)
    *H01Q 21/06*        (2006.01)

(52) U.S. Cl.
    CPC ............ *H01Q 21/065* (2013.01); *H02J 7/02* (2013.01); *H02J 7/025* (2013.01); *H02J 50/10* (2016.02); *H02J 50/23* (2016.02); *H02J 50/40* (2016.02); *H02J 50/80* (2016.02); *H02J 50/90* (2016.02)

(58) Field of Classification Search
    CPC ........ H02J 7/025; H02J 50/40; H02J 7/00034; H01Q 3/28; H01Q 3/36; H01Q 9/0407; H01Q 21/065
    See application file for complete search history.

(56) References Cited

U.S. PATENT DOCUMENTS

| | | | | |
|---|---|---|---|---|
| 9,825,674 | B1* | 11/2017 | Leabman | H02J 50/20 |
| 9,853,458 | B1* | 12/2017 | Bell | H02J 5/005 |
| 10,298,048 | B1* | 5/2019 | Juan | H02J 50/10 |
| 10,312,744 | B2* | 6/2019 | Zeine | H02J 50/20 |
| 2011/0115433 | A1* | 5/2011 | Lee | H02J 50/10 |
| | | | | 320/108 |
| 2013/0063083 | A1* | 3/2013 | Park | H02J 7/0013 |
| | | | | 320/108 |
| 2013/0234661 | A1* | 9/2013 | Yang | H04W 12/06 |
| | | | | 320/108 |
| 2013/0271088 | A1* | 10/2013 | Hwang | H02J 50/80 |
| | | | | 320/155 |
| 2014/0292269 | A1* | 10/2014 | Keating | H02J 50/80 |
| | | | | 320/108 |
| 2015/0048789 | A1* | 2/2015 | Kim | H02J 50/80 |
| | | | | 320/108 |
| 2015/0137749 | A1* | 5/2015 | Park | H02J 50/50 |
| | | | | 320/108 |
| 2016/0013685 | A1 | 1/2016 | Zeine | |
| 2016/0094092 | A1 | 3/2016 | Davlantes et al. | |
| 2016/0099602 | A1* | 4/2016 | Leabman | H04W 4/80 |
| | | | | 307/104 |
| 2016/0226292 | A1* | 8/2016 | Yoon | H02J 50/10 |
| 2016/0301264 | A1* | 10/2016 | Zeine | H02J 7/025 |
| 2017/0085112 | A1* | 3/2017 | Leabman | H02J 50/402 |
| 2017/0237296 | A1* | 8/2017 | Keith | H02J 50/12 |
| | | | | 307/104 |

FOREIGN PATENT DOCUMENTS

| | | | | |
|---|---|---|---|---|
| KR | 20130073861 | A | * | 7/2013 |
| KR | 10-1343573 | | | 12/2013 |
| KR | 10-1350309 | | | 1/2014 |
| KR | 10-2015-0019503 | | | 2/2015 |
| KR | 10-1497303 | | | 3/2015 |
| KR | 10-2016-0075913 | | | 6/2016 |
| KR | 20160075913 | A | * | 6/2016 |
| KR | 10-2016-0086252 | | | 7/2016 |
| KR | 20160086252 | A | * | 7/2016 |

OTHER PUBLICATIONS

Extended Search Report dated Jul. 5, 2019 in counterpart European Patent Application No. 17866400.9.
International Search Report and Written Opinion dated Oct. 18, 2017 in counterpart International Patent Application No. PCT/KR2017/007362.

* cited by examiner

WIRELESS POWER TRANSMISSION DEVICE AND CONTROL METHOD THEREOF

CROSS-REFERENCE TO RELATED APPLICATIONS

This application is based on and claims priority under 35 U.S.C. § 119 to Korean Application Serial No. 10-2016-0145039, filed in the Korean Intellectual Property Office on Nov. 2, 2016, and U.S. Provisional Patent Application Ser. No. 62/336,088, filed in the U.S. Patent and Trademark Office on May 13, 2016, the contents of each of which are incorporated by reference herein in their entireties.

TECHNICAL FIELD

The present disclosure relates generally to a wireless power transmission device and a control method thereof, and for example, to a wireless power transmission device and a control method thereof which can wirelessly transmit power to an electronic device.

BACKGROUND

Portable digital communication devices have become daily necessities for many people who live in modern times. Consumers desire to receive various high-quality services, anywhere and at any time. Besides, due to the recent progress of an Internet of Things (IoT) technology, various sensors, home electric appliances, communication devices, and the like which exist in our lives are included in a network. A wireless power transmission system is desirable in order to cause the various sensors and devices to smoothly operate.

Methods for wireless power transmission are a magnetic induction method, a magnetic resonance method, and an electromagnetic wave method, and the electromagnetic wave method is advantageous in terms of long-distance power transmission as compared to other methods.

The electromagnetic wave method is mainly used for long-distance power transmission, and to detect an accurate location of a power receiver located at a long distance and to most efficiently deliver power, which are crucial to the electromagnetic wave method.

The electromagnetic wave method is used to radiate electromagnetic waves corresponding to wireless power using multiple cell antennas, and is used to efficiently deliver wireless power by controlling the phase and magnitude of an electromagnetic wave corresponding to wireless power radiated by each cell antenna according to a location at which a target (a wireless power reception device or an electronic device) is located.

When wireless power is transmitted using an electromagnetic wave method, if two or more electronic devices need wireless power, it is required to appropriately distribute and transmit wireless power to the respective electronic devices. Conventionally, groups of multiple cell antennas are created by dividing the multiple cell antennas by the number of electronic devices that receive wireless power according to the number thereof, power is distributed to the created groups, and wireless power is transmitted to each of the created groups.

SUMMARY

A wireless power transmission device according to various example embodiments of the present disclosure can dynamically group multiple cell antennas based on the number of electronic devices that need wireless power, the locations of the electronic devices, and the distances thereof, can distribute wireless power to the grouped cell antennas, and thereby can efficiently transmit wireless power. According to example embodiments of the present disclosure, the number of cell antennas included in each group may be changed based on electronic devices that receive wireless power.

In accordance with an example aspect of the present disclosure, a wireless power transmission device is provided. The wireless power transmission device includes a communication circuit configured to receive information transmitted by an electronic device that receives wireless power; an array antenna including multiple cells configured to radiate wireless power; and a controller configured to receive the information transmitted by the electronic device through the communication circuit, to combine the multiple cells included in the array antenna based on the information and to create a group corresponding to the electronic device, and to control multiple cells included in the group.

In accordance with another example aspect of the present disclosure, a method for transmitting power by a wireless power transmission device including an array antenna including multiple cells is provided. The method includes receiving information from an electronic device; combining the multiple cells forming the array antenna based on the received information; creating a group corresponding to the electronic device; and controlling multiple cells included in the created group.

According to example embodiments of the present disclosure, the wireless power transmission device can combine multiple cells that radiate wireless power and can create groups corresponding to electronic devices, that receive wireless power, based on information transmitted by the electronic devices; can control multiple cells included in each group; and thereby can efficiently provide wireless power.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
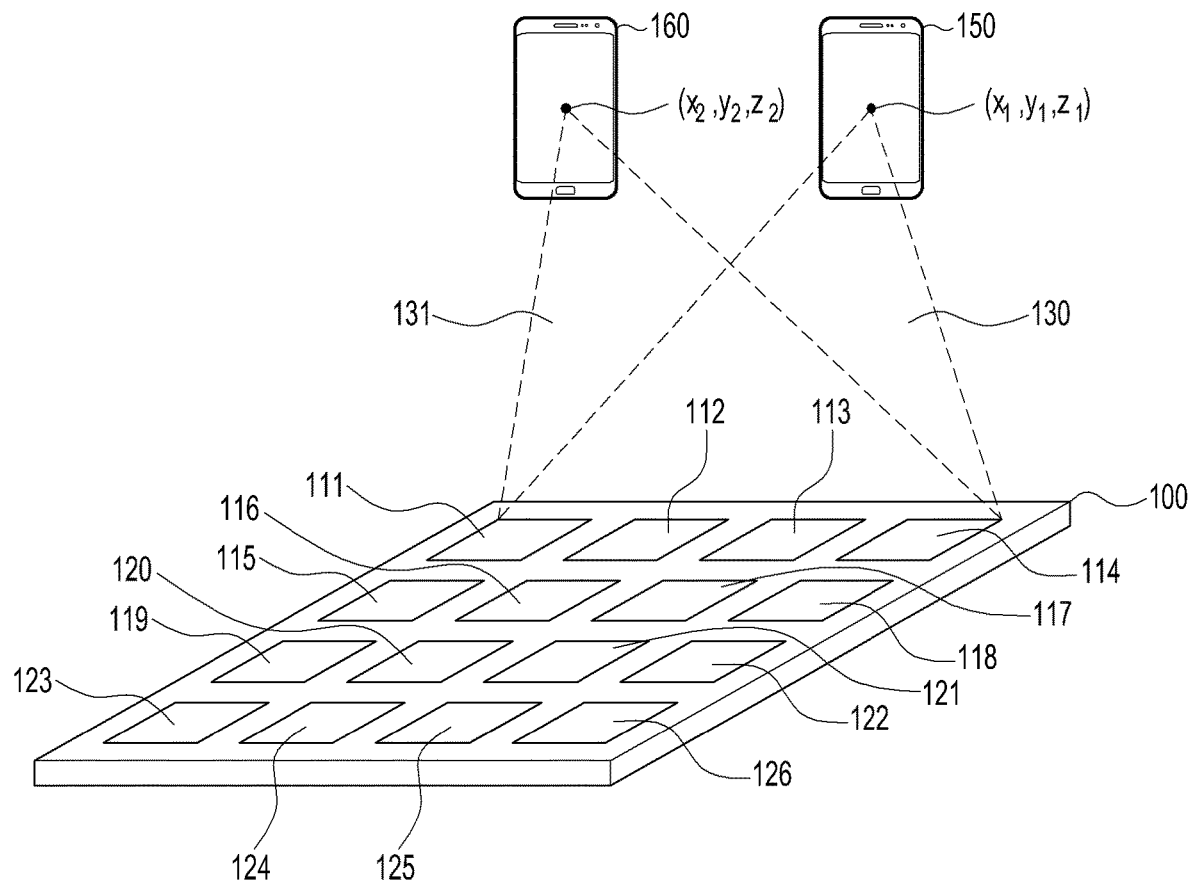
FIG. 1 is a diagram illustrating an example concept of a wireless power transmission device and a wireless power reception device according to an example embodiment of the present disclosure.

Hereinafter, various example embodiments of the present disclosure will be described with reference to the accompanying drawings. It should be understood that the example embodiments and the terms used herein are not intended to limit the present disclosure to the particular forms disclosed and the present disclosure is intended to cover various modifications, equivalents, and/or alternatives of the corresponding example embodiments. In describing the drawings, similar reference numerals may be used to designate similar elements.

As used herein, the singular forms may include the plural forms as well, unless the context clearly indicates otherwise. In the present disclosure, the expression "A or B" or "at least one of A and/or B" may include all possible combinations of the items listed. The expression "a first", "a second", "the first", or "the second" may modify corresponding elements regardless of the order or the importance, and is used only to distinguish one element from another element, but does not limit the corresponding elements. When an element (e.g., first element) is referred to as being (operatively or communicatively) "connected," or "coupled," to another element (e.g., second element), it may be directly connected or coupled directly to the other element or any other element (e.g., third element) may be interposed between them.

In the present disclosure, the expression "configured to" may be used interchangeably with, for example, "suitable for", "having the capacity to", "adapted to", "made to", "capable of", or "designed to" in terms of hardware or software, based on circumstances. In some situations, the expression "device configured to" may refer, for example, to a situation in which the device, together with other devices or components, "is able to". For example, the phrase "controller adapted (or configured) to perform A, B, and C" may refer, for example, and without limitation, to a dedicated controller/processor (e.g. embedded controller) only for performing the corresponding operations or a generic-purpose controller (e.g., Central Processing Unit (CPU) or Application Processor (AP)) that can perform the corresponding operations by executing one or more software programs stored in a memory device.

A wireless power reception device according to various example embodiments of the present disclosure may refer, for example, to an electronic device that receives wireless power, and may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a medical device, a camera, and a wearable device, or the like, but is not limited thereto. According to various example embodiments of the present disclosure, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto. According to some example embodiments of the present disclosure, the wireless power reception device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto. Also, the wireless power reception device may include an Internet of Things (IoT) device and an IoT sensor.

Further, the wireless power reception device may include a smart car. The smart car may refer to a car that recognizes, in real time, situations inside/outside the car by using next-generation electric/electronic, information and communication, and control technologies in combination. The smart car may also be referred to as a connected car. The smart car can be driven by using an electrical battery instead of fossil fuel, and thus may have a meaning covering an electric car.

The wireless power reception device according to example embodiments of the present disclosure is not limited to the above-described devices.

In example embodiments of the present disclosure, the term "user" may refer to a person who operates a wireless power transmission device or a wireless power reception device. Also, the term "user" may refer to a device (e.g., an artificial intelligence wireless power reception device, a robot, etc.) that operates a wireless power transmission device or a wireless power reception device.

In example embodiments of the present disclosure, the term "array antenna" may refer, for example, to "multiple cell antennas."

In example embodiments of the present disclosure, the term "cell" may refer, for example, to a "cell antenna."

In example embodiments of the present disclosure, the term "wireless power" may refer, for example, to an "electromagnetic wave radiated by a cell."

In example embodiments of the present disclosure, the term "beam" may refer, for example, to concentrating electromagnetic waves at a particular location through constructive interference by controlling magnitudes and phases of multiple electromagnetic waves.

In example embodiments of the present disclosure, the charging of an electronic device by a wireless power transmission device may refer, for example, to the transmission of wireless power to the electronic device, or may refer, for example, to radiating, by a cell, an electromagnetic wave corresponding to wireless power toward the electronic device.

Hereinafter, various example embodiments of the present disclosure will be described in greater detail with reference to the accompanying drawings.

FIG. 1 is a diagram illustrating an example concept of a wireless power transmission device and a wireless power reception device according to an example embodiment of the present disclosure.

The wireless power reception device may refer, for example, to an electronic device capable of wirelessly receiving power. In the following description, the term "electronic device" may be used to refer to a wireless power reception device.

The wireless power transmission device 100 may wirelessly transmit power to at least one electronic device 150 and 160. In an example embodiment of the present disclosure, the wireless power transmission device 100 may include multiple cell antennas 111 to 126. The cell antennas 111 to 126 are not limited if the cell antennas 111 to 126 are capable of generating RF waves. At least one of the amplitude and phase of an RF wave generated by the cell antennas 111 to 126 may be adjusted by the wireless power transmission device 100. For convenience of description, an RF wave generated by each of the cell antennas 111 to 126 will be generally referred to as a "sub-RF wave."

Also, each of the cell antennas 111 to 126 will be referred to as a "cell," and the grouping of two or more cell antennas will be referred to as a "group."

In various example embodiments of the present disclosure, the wireless power transmission device 100 may adjust at least one of the amplitude and phase of each of sub-RF waves radiated by the cell antennas 111 to 126. However, sub-RF waves radiated by the respective cell antennas may interfere with each other. For example, sub-RF waves may constructively interfere with each other at any one point, and sub-RF waves may destructively interfere with each other at another point. The wireless power transmission device 100 according to an example embodiment of the present disclosure may adjust at least one of the amplitude and phase of each of sub-RF waves generated by the cell antennas 111 to 126 so that the sub-RF waves may constructively interfere with each other at a first point (x1, y1, z1). For example, the wireless power transmission device 100 may adjust at least one of the amplitude and phase of a sub-RF wave generated by each cell antenna, and may control each cell antenna in such a manner that, at an optional location, the respective sub-RF waves constructively interfere with each other and an RF wave for delivering wireless power forms a substantially maximum amplitude.

For example, the wireless power transmission device 100 may determine that the electronic device 150 is disposed at a first point (x1, y1, z1). Here, the location of the electronic device 150 may be, for example, a point at which a power reception antenna of the electronic device 150 is located. A configuration in which the wireless power transmission device 100 determines the location of the electronic device 150 will be described in greater detail below. In order to cause the electronic device 150 to receive wireless power with high efficiency, sub-RF waves radiated by the respective cell antennas need to constructively interfere with each other at the first point (x1, y1, z1). Accordingly, the wireless power transmission device 100 may control the cell antennas 111 to 126 in such a manner that the sub-RF waves constructively interfere with each other at the first point (x1, y1, z1). Here, controlling the cell antennas 111 to 126 may refer, for example, to controlling the magnitude of a signal which is input to the cell antennas 111 to 126, or may refer, for example, to controlling the phase (or delay) of a signal which is input to the cell antennas 111 to 126.

Meanwhile, those skilled in the art can easily understand beamforming, which is a technique for controlling such that RF waves constructively interfere with each other at a particular point. There is no limit to the type of beamforming used in the present disclosure, and those skilled in the art can easily understand that there is no limit to the type of beamforming used in the present disclosure. RF waves formed by beamforming may be referred to, for example, as "pockets of energy."

An RF wave 130 formed by sub-RF waves may have a maximum or substantially maximum and/or increased amplitude at the first point (x1, y1, z1), and accordingly, the electronic device 150 may receive wireless power with high efficiency. Meanwhile, the wireless power transmission device 100 may determine that the electronic device 160 is disposed at a second point (x2, y2, z2). In order to charge the electronic device 160, the wireless power transmission device 100 may control the cell antennas 111 to 126 in such a manner that sub-RF waves constructively interfere with each other at the second point (x2, y2, z2). Accordingly, an RF wave 140 formed by sub-RF waves radiated by the multiple cells may have a maximum or substantially maximum and/or increased amplitude at the second point (x2, y2, z2), and thus, the electronic device 160 may receive wireless power with high efficiency.

As described above, the wireless power transmission device 100 may determine the locations of the electronic devices 150 and 160, may cause the sub-RF waves to constructively interfere with each other at each of the determined locations, and thereby may perform wireless charging with high transmission efficiency.

Figure 2:
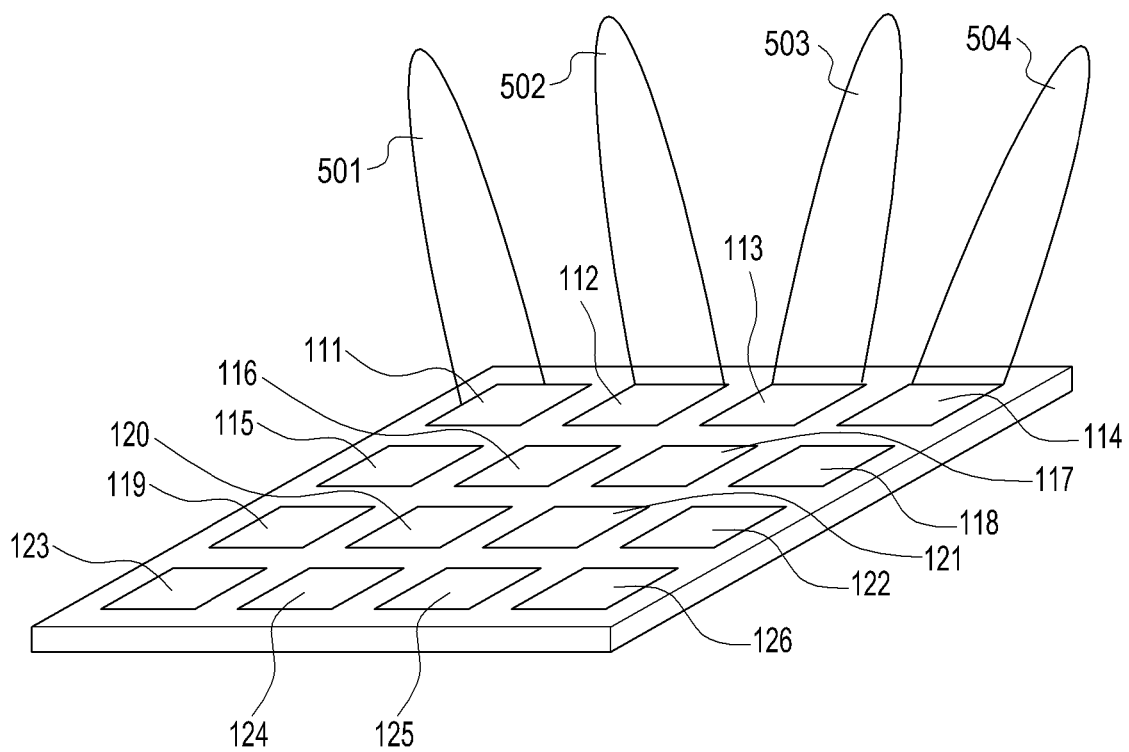
FIG. 2 is a diagram illustrating an example of radiating Radio Frequency (RF) waves in various directions by an array antenna of a wireless power transmission device according to an example embodiment of the present disclosure.

FIG. 2 is a diagram illustrating an example of radiating RF waves in various directions by an array antenna of a wireless power transmission device according to an example embodiment of the present disclosure.

Referring to FIG. 2, a first cell antenna 111, a second cell antenna 112, a third cell antenna 113, and a fourth cell antenna 114 may be controlled to radiate respective sub-RF waves having different amplitudes and phases in order to form a beam in a particular direction, and the respective cells may form sub-RF waves 501, 502, 503, and 504 generated so as to have controlled amplitudes and phases.

The number of the formed sub-RF waves may be identical to the total number of cells forming the array antenna, but the number of beams may be less than the total number of the cells of the array antenna, when appropriate beamforming is performed in order to increase the efficiency of wireless power transmission. For example, the number of beams may be adjusted based on the number of electronic devices that need wireless charging, and thus, the number of required beams may be less than the total number of the cells of the array antenna.

Figure 3:
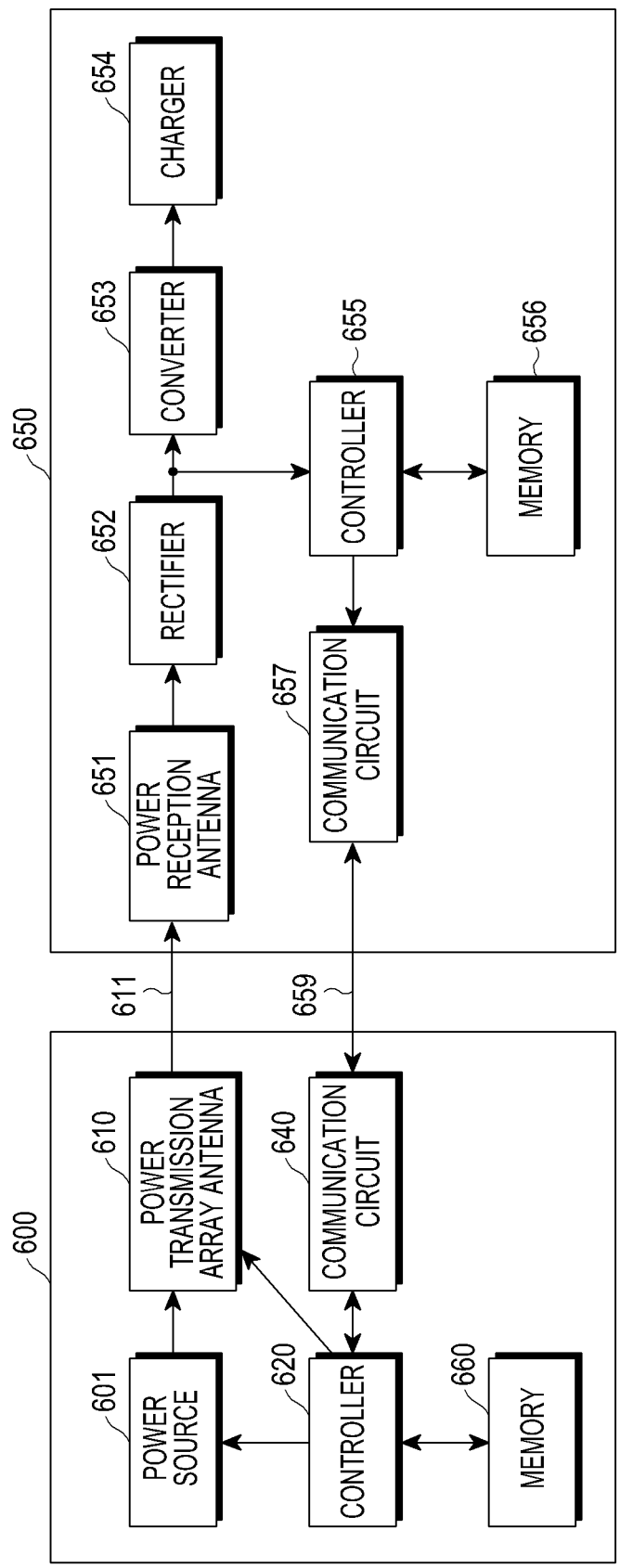
FIG. 3 is a block diagram illustrating an example configuration of a wireless power transmission device according to an example embodiment of the present disclosure.

FIG. 3 is a block diagram illustrating an example configuration of a wireless power transmission device according to an example embodiment of the present disclosure.

The wireless power transmission device 600 may include a power source 601, a power transmission array antenna 610, a controller (e.g., including processing circuitry) 620, a memory 660, and a communication circuit 640.

An electronic device 650 is not limited if the electronic device 650 is capable of wirelessly receiving power, and may include a power reception antenna 651, a rectifier (e.g., including a rectifier circuit) 652, a converter (e.g., including a converter circuit) 653, a charger (e.g., including a charging circuit) 654, a controller (e.g., including processing circuitry) 655, a memory 656, and a communication circuit 657. The power reception antenna 651 may be an array antenna that includes multiple cells.

The power source 601 may provide the power transmission array antenna 610 with power that the power transmission array antenna 610 requires in order to transmit wireless power. The power source 601 may provide, for example, Direct Current (DC) power, and in this case, the wireless power transmission device 600 may further include an inverter (not illustrated) that converts DC power into Alternating Current (AC) power and delivers the AC power to the power transmission array antenna 610. Meanwhile, in another example embodiment of the present disclosure, the power source 601 may provide AC power to the power transmission array antenna 610.

The power transmission array antenna 610 may include multiple cell antennas. For example, the power transmission array antenna 610 may include the multiple cell antennas illustrated in FIG. 1. The number or array formation of cell antennas that form the power transmission array antenna 610 is not limited. The power transmission array antenna 610 may form an RF wave using power supplied from the power source 601. The power transmission array antenna 610 may form an RF wave in a particular direction under the control of the controller 620. Here, forming an RF wave in a particular direction may refer, for example, to controlling at least one of the amplitude and phase of each of sub-RF waves in such a manner that the sub-RF waves constructively interfere with each other at one point located in the particular direction.

The controller 620 may include various processing circuitry and may transmit a pilot signal through the array antenna in order to determine a location of an electronic device that receives wireless power. For example, the controller 620 may control the power transmission array antenna 610 to form an RF wave (e.g., a pilot signal) for detecting the electronic device 650 to be charged in each of multiple directions. Here, the RF wave transmitted in order to detect the electronic device to be charged may be referred to, for example, as a "detection RF wave." A method for detecting an electronic device using a pilot signal will be described below.

As described above, through the array antenna, the wireless power transmission device may not only transmit wireless power, but may also transmit a pilot signal, which is an RF wave, to detect the location of an electronic device that receives wireless power.

Also, the wireless power transmission device may detect the location of an electronic device using a triangulation method, an In-phase and Quadrature (IQ) signal processing technique, a Doppler effect technique, and the like, but is not limited thereto.

The memory 660 may store a program or an algorithm which is used to generate a detection RF wave (e.g., a pilot signal) in each of multiple directions. The controller 620 may control at least one of the phase and amplitude of each of the cell antennas of the power transmission array antenna 610 by using the program or algorithm stored in the memory 660.

A method for detecting an electronic device to be charged using the above-described pilot signal will be described in detail below.

At a first time point, the controller 620 may control the power transmission array antenna 610 to form a detection RF wave (e.g., a pilot signal) in each of predefined multiple directions during a first time period. That is, the controller 620 may perform a control operation for forming a detection RF wave (e.g., a pilot signal) during a detection time period for confirming the existence of the electronic device to be changed, and transmitting the detection RF wave to each of multiple directions within a wireless charging space covered by the wireless power transmission device.

After the first time period elapses, the controller 620 may control the cell antennas of the power transmission array antenna 610 to receive a reflected signal during a second time period. As described above, the cell antennas may receive signals produced by the reflection of the pilot signals in the wireless charging space, and the controller 620 may determine which pilot signals correspond to the respective reflected signals. For example, a pilot signal including identification information assigned for each pilot signal may be transmitted, and the identification information may be extracted from a reflected signal received due to the reflection of the transmitted pilot signal, and a determination may be made as to which pilot signal corresponds to the received reflected signal.

The controller 620 may extract various characteristic values of the received pilot signal. The controller 620 may extract, from the reflected signal, delay time information which is, for example, a difference between a transmission time point of the pilot signal and a reception time point of the reflected wave, phase displacement information which is a phase difference between the pilot signal and the received reflected wave, information on an attenuation magnitude which is a difference between the magnitude of the pilot signal and that of the received reflected wave, signal key information assigned when the pilot signal has been modulated, and error information, and may then store the same.

For example, the controller 620 may store reference information shown in Table 1 below to which characteristic values are mapped which have been extracted from a reflected wave received in response to a direction to which each pilot signal has been transmitted.

TABLE 1

| Direction | Attenuation Magnitude (dB) | Phase Change (rad) | Dealy time (Time of Flight) (μs) |
|---|---|---|---|
| first direction | −2 | +13 | 0.12 |
| second direction | −4 | −2 | 0.24 |
| third direction | −3 | +17 | 0.15 |
| fourth direction | −4.1 | −3 | 0.28 |

In a state of storing the above-described reference information, the controller 620 may transmit respective pilot signals to multiple directions during a first time period in order to detect whether an electronic device is located in a charging space at a second time point. As described above, the respective pilot signals including pieces of identification information are transmitted to the predefined multiple directions. After the pilot signals are transmitted, the wireless power transmission device receives reflected waves, which correspond to the pilot signals transmitted to the respective directions, by using the array antenna during a second time period. As described above, the controller 620 may extract characteristic values from each of the received reflected waves, and may compare the newly-extracted characteristic values of the reflected waves with the pre-stored reference information.

The controller 620 may determine at least one of a direction and a location, in/at which the subject to be detected is disposed, based on a result of the comparison. For example, as shown in Table 1, the reference information in the fourth direction may include a signal attenuation of −4.1 dB, a phase change of −3 rad, and a delay time period of 0.28 μs. Meanwhile, the wireless power transmission device may extract that a signal, which has been reflected in the fourth direction at a second time point, has a signal attenuation of −1.2 dB, a phase change of 40 rad, and a time of flight of 0.12 μs as compared with the relevant pilot signal. Accordingly, with respect to the fourth direction, the wireless power transmission device may detect a difference between characteristic values of a reflected wave received in response to a pilot signal transmitted at the first time point, and characteristic values of a reflected wave received in response to a pilot signal transmitted at the second time point. The wireless power transmission device may detect an amplitude attenuation of 2.9 dB, a phase change of 43 rad, and a delay time period of 0.16 μs.

When it is determined that a difference between the reference information and the characteristic values of the reflected signal exceeds a threshold, the wireless power transmission device may determine that the subject to be detected is located in the relevant direction. Also, using the delay time period and phase displacement of the reflected signal, the controller 620 may determine a distance and direction of the electronic device with the wireless power transmission device as a reference. Further, the controller 620 may detect a signal reflection characteristic of the object by using attenuation magnitude information. In addition, the controller 620 may confirm an accurate transmission time point of a pilot signal, the signal fading of a path, and the like using signal key information assigned when the pilot signal has been modulated.

The controller 620 may determine whether the subject to be detected that is located in the detected direction is the electronic device 650 that may perform wireless charging or is an obstacle that may not perform wireless charging, through the above-described comparison process. For example, the controller 620 may determine whether the subject to be detected is the electronic device 650 that needs charging or is an obstacle that cannot be charged, based on whether a communication signal 659 from the electronic device 650 is received through the communication circuit 640. When it is determined that the subject to be detected is the electronic device 650 that needs charging, the controller 620 may transmit a charging RF wave to the electronic device 650 and may wirelessly charge the electronic device 650. Also, the controller 620 may reflect the detected subject in the reference information, may change a location displacement reference of the electronic device 650, and thereby may re-designate, as a reference, the changed location in place of the existing location.

The controller 620 may determine a direction in which the electronic device 650 is located, and may determine a formation direction of an RF wave on the basis of the determined direction. For example, the controller 620 may control the cell antennas of the power transmission array antenna 610 that generates sub-RF waves, in such a manner that the sub-RF waves constructively interfere with each other at one point located in the determined direction. For example, the controller 620 may control the cell antennas or a control means that is connected to the cell antennas, and thereby may control at least one of the amplitude and phase of a sub-RF wave generated by each of the cell antennas.

The power reception antenna 651 is not limited if the power reception antenna 651 is capable of receiving an RF wave 611 from the power transmission array antenna 610. Also, the power reception antenna 651 may be implemented in the form of an array antenna that includes multiple antennas. The rectifier 652 may rectify AC power, which has been received by the power reception antenna 651, to DC power. The converter 653 may convert DC power into a required voltage and may provide the required voltage to the charger 654. The charger 654 may charge a battery (not illustrated). Meanwhile, although not illustrated, the converter 653 may provide the converted power to a Power Management Integrated Circuit (PMIC) (not illustrated), and the PMIC may provide required power to the various hardware elements of the electronic device 650.

Meanwhile, the controller 655 may monitor a voltage of an output terminal of the rectifier 652. For example, the electronic device 650 may further include a voltmeter that is connected to the output terminal of the rectifier 652; and the controller 655 may receive the value of a voltage from the voltmeter, and may monitor the voltage of the output terminal of the rectifier 652. The controller 655 may provide the communication circuit 657 with information including the voltage value of the output terminal of the rectifier 652. The communication circuit 657 may transmit a communication signal 659, which includes reception power-related information, to the wireless power transmission device 600 through a communication antenna (not illustrated). The reception power-related information may be, for example, information related to the magnitude of received power, such as the magnitude of the voltage of the output terminal of the rectifier 652, and may include the magnitude of a current of the output terminal of the rectifier 652. In this case, those skilled in the art can easily understand that the electronic device 650 may further include an ammeter capable of measuring the current of the output terminal of the rectifier 652. Also, a position at which the reception power-related information is measured may be any point of the electronic device 650 as well as the output terminal of the rectifier 652 without any limitation if the magnitude of the received power is capable of being confirmed at the position.

Further, as described above, the controller 655 may transmit a communication signal 659, which includes identification information of the electronic device 650, to the wireless power transmission device 600 through the communication circuit 657. The memory 656 may store a program or an algorithm capable of controlling the various hardware elements of the electronic device 650. The stored program or algorithm may be executed by the controller 655 and may operate the electronic device 650.

Figure 4A:
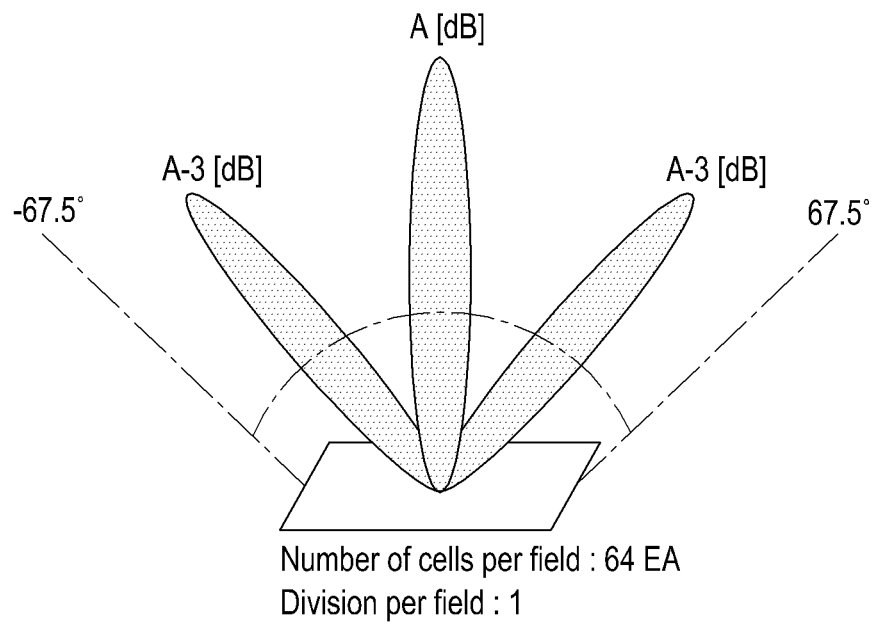
FIGS. 4A, 4B and 4C are diagrams illustrating example wireless power fields formed by an array antenna according to various example embodiments of the present disclosure.
Figure 4B:
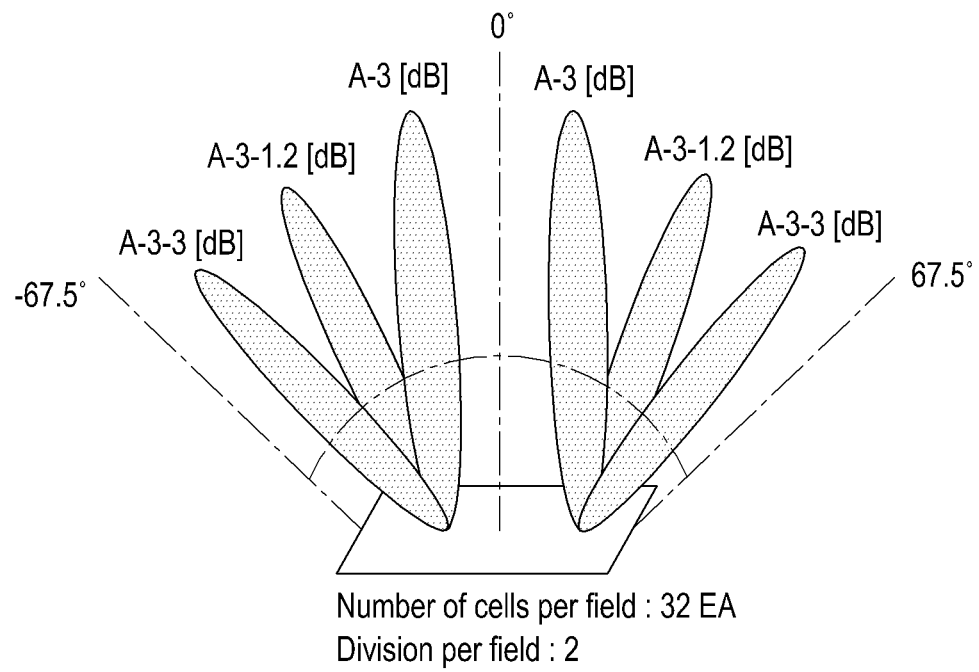
Figure 4C:
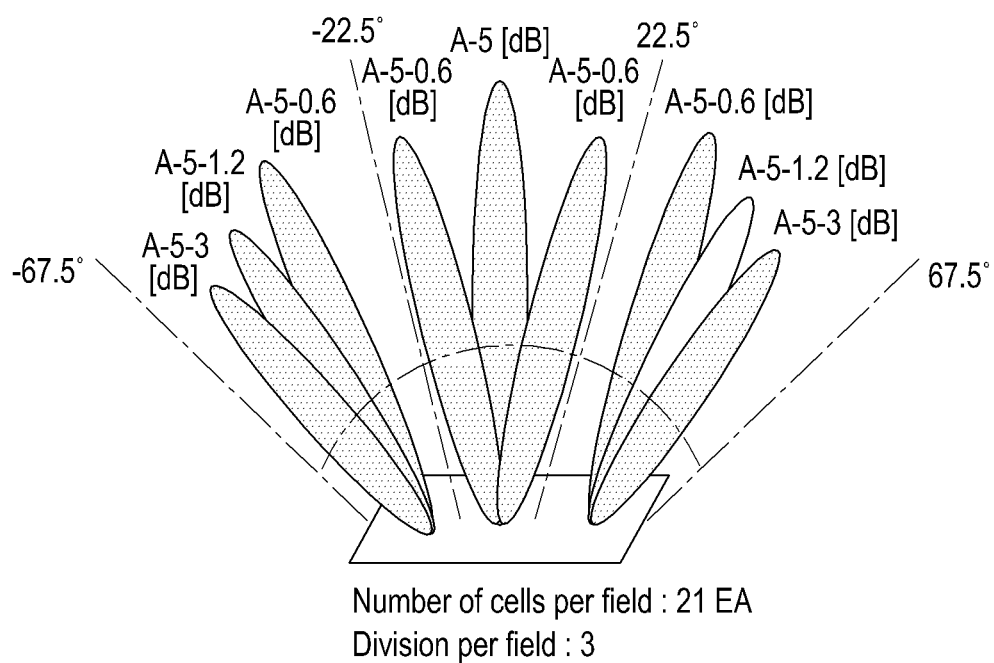

FIGS. 4A, 4B and 4C are diagrams illustrating example wireless power fields formed by an array antenna according to various example embodiments of the present disclosure. Here, the term "wireless power field" may refer, for example, to an RF wave which is beamformed, namely, is oriented to a particular direction.

Referring to FIG. 4A, when there is one electronic device that receives wireless power, the wireless power transmission device may form one field through the array antenna. For example, when the number of antenna cells is 64, the wireless power transmission device may form a field so as to cause a maximum of 64 cells to focus on one wireless power reception device. That is, the wireless power transmission device may form a field so that an RF wave radiated by the maximum of 64 cells may have the highest amplitude in the electronic device.

For convenience of description, consideration is given to a case where only a theta direction of a spherical coordinate system is considered and a displacement of 0 to 360 degrees occurs in a pi direction.

Referring to FIG. 4B, when there are two electronic devices that receive wireless power, the wireless power transmission device may form two fields through the array antenna. For example, when the number of antenna cells is 64, the wireless power transmission device may control up to a maximum of 32 cells to generate a field. For example, the wireless power transmission device may cause the 32 cells to form a first field, and may cause the remaining 32 cells to form a second field. The first field may be formed in a range of −67.5 to 0 degrees, and the second field may be formed in a range of 0 to +67.5 degrees.

Referring to FIG. 4C, when there are three electronic devices that receive wireless power, the wireless power transmission device may form three fields through the array antenna. For example, when the number of antenna cells is 64, the wireless power transmission device may control up to a maximum of 22 cells to generate a field. For example, 22 antenna cells may be assigned to a first field, 22 antenna cells may be assigned to a second field, and 22 antenna cells may be assigned to a third field. The first field may be formed in a range of −67.5 to −22.5 degrees, the second field may be formed in a range of −22.5 to +22.5 degrees, and the third field may be formed in a range of +22.5 to +67.5 degrees.

Figure 5A:
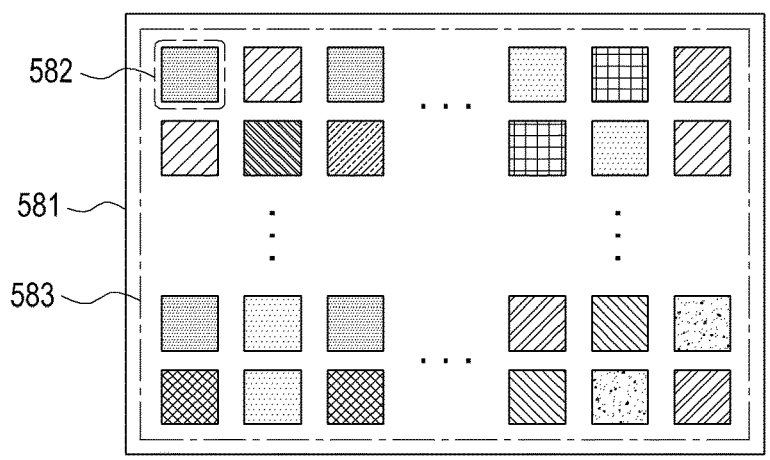
FIGS. 5A, 5B and 5C are diagrams each illustrating an example in which a wireless power transmission device controls phases of cells forming an array antenna and transmits power to multiple electronic devices according to various example embodiments of the present disclosure.
Figure 5B:
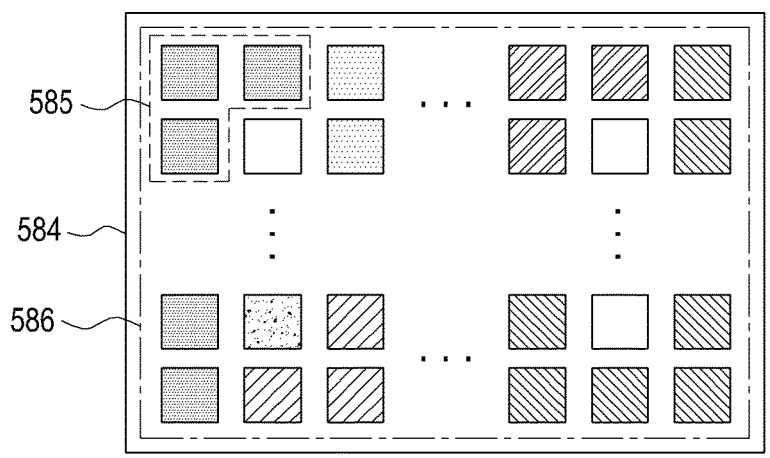
Figure 5C:
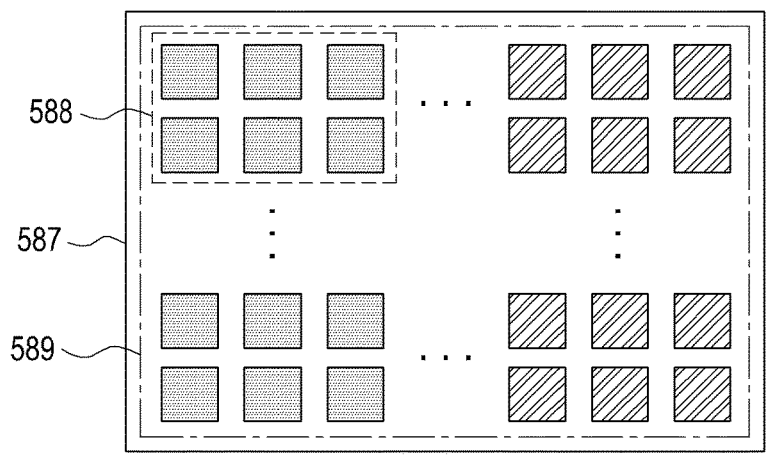

FIGS. 5A, 5B and 5C are diagrams each illustrating an example in which a wireless power transmission device controls phases of cells forming an array antenna and transmits power to multiple electronic devices. For example, the respective cells are antennas that radiate sub-RF waves; and may cause the sub-RF waves to constructively interfere with each other so as to have the highest and/or increased amplitude at the location of an electronic device to be wirelessly charged, and may transmit wireless power to the electronic device. To this end, the controller of the wireless power transmission device may control at least one of the phase and amplitude of a sub-RF wave radiated by each of the cells.

FIG. 5A illustrates the array antenna 581 and the multiple cells 583 that form the array antenna 581. The controller may control at least one of the phase and amplitude of a sub-RF wave radiated by each cell 582 that forms the array antenna 581. For example, the controller of the wireless power transmission device may control at least one of a phase and an amplitude of power supplied to each of the multiple cells 582 that forms the array antenna 581, and thereby may change a magnitude and a phase of a sub-RF signal radiated by each of the multiple cells 582.

Since the controller needs to individually control phases and amplitudes over the respective cells and a large number of subjects that need to be controlled exist, a large amount of arithmetic operation may be required, and it may take a long time to perform a control operation. However, since the respective cells are individually controlled, it is advantageous to be capable of providing wireless power to multiple wireless power reception devices that require wireless power having various magnitudes. Also, it is advantageous to be capable of being flexible in responding to even a case where the number and locations of electronic devices that receive wireless power are changed.

For example, when the number of electronic devices that receive wireless power is 2, the controller may control the respective cells according to locations of the wireless power reception devices, and may radiate an RF wave, which corresponds to wireless power, in such a manner that the RF wave targets each of the electronic devices.

FIG. 5B illustrates an array antenna 584, multiple cells 586, and a group 585.

The wireless power transmission device may dynamically combine the multiple cells and may group the multiple cells into multiple groups. That is, the number of cells included in each group may be different for each group.

The controller of the wireless power transmission device may dynamically group the multiple cells according to the number and locations of electronic devices that receive wireless power, and the amount of power required by each of the electronic devices, and thereby may create multiple groups. The number of cells included in each group, and combinations of cells may be changed according to the locations of the electronic devices that receive wireless power, directions in which the electronic devices are disposed, and the amount of power required by each of the electronic devices. The wireless power transmission device may control each group as one unit. For example, the wireless power transmission device may control, together, phases and amplitudes over cells belonging to an identical group. The wireless power transmission device may control a magnitude and a phase of a sub-RF signal radiated by each of cells included in a group in such a manner that one cell group transmits wireless power to one target (e.g., one electronic device). That is, the wireless power transmission device may control at least one of a phase and a magnitude of power supplied to each of cells that are included in a group, on the basis of at least one of the location and distance of an electronic device desired to be charged. At this time, the number of cells belonging to each group may be different for each group, according to the number, directions, and distances of electronic devices to be charged, and the amount of power required by each of the electronic devices, and the like.

For example, when the wireless power transmission device groups 64 cells into a first group, a second group, a third group, and a fourth group, the wireless power transmission device may assign 20 cells to the first group, may assign 18 cells to the second group, may assign 16 cells to the third group, and may assign 10 cells to the fourth group. That is, the wireless power transmission device may differently adjust the number of cells assigned to each group, according to locations and disposition directions of electronic devices that receive wireless power, and the amount of power required by each of the electronic devices.

FIG. 5C illustrates an array antenna 587, multiple cells 589, and a group 588.

The wireless power transmission device may form combinations of the multiple cells so as to all have an identical number of cells, and thereby may create respective groups from the combinations. That is, each group has an identical number of cells. The controller may form combinations of the multiple cells so as to all have an identical number of cells and may create respective groups from the combinations, according to the number of wireless power reception devices, location information thereof, and the amount of power required by each of the wireless power reception devices. Also, the controller may adjust the amount of power supplied to the cells included in each of the groups, and thereby may adjust the amount of power supplied to the wireless power reception device.

For example, when the number of electronic devices that receive wireless power is 4 and the number of cells forming the array antenna is 64, the wireless power transmission device may group the 64 cells into four groups, and the number of cells included in each of the four groups is identically 16. That is, the wireless power transmission device may assign 16 cells to each electronic device. Thereafter, when the disposition locations of the electronic devices that receive wireless power are changed, the wireless power transmission device may generate a field so that each group may target the corresponding electronic device without changing the number of the cells included in each group. Here, the term "targeting an electronic device" may refer to generating a field so as to form a beam oriented to the electronic device.

Figure 6:
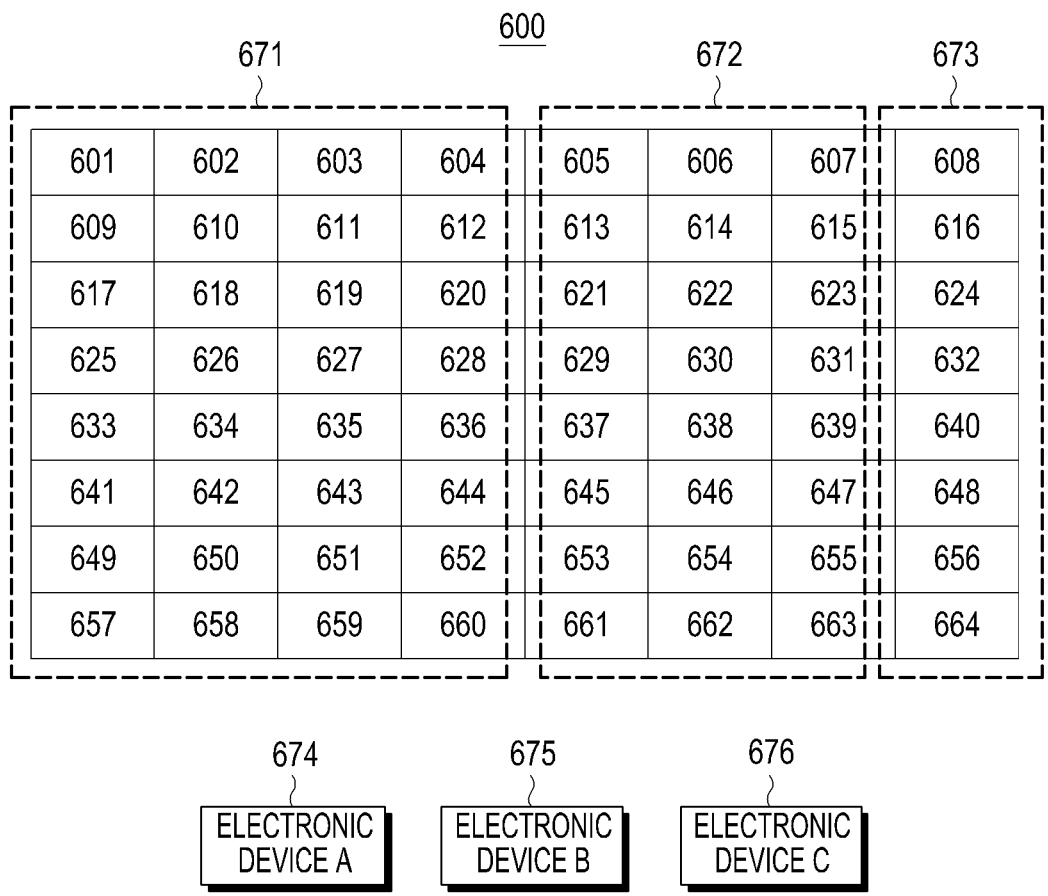
FIG. 6 is a diagram illustrating an example of grouping multiple cells forming an array antenna in order to transmit wireless power according to an example embodiment of the present disclosure.

FIG. 6 is a diagram illustrating an example of grouping multiple cells forming an array antenna in order to transmit wireless power according to an example embodiment of the present disclosure.

FIG. 6 illustrates the array antenna 600 and multiple electronic devices 674, 675, and 676. The array antenna 600 may include the multiple cells 601 to 664. The multiple cells 601 to 664 may be grouped into, for example, three groups 671, 672, and 673.

The magnitude of power required by each of the electronic devices may, for example, and without limitation, be set to be in order of the electronic device A>the electronic device B>the electronic device C. The wireless power transmission device may receive information transmitted by each of the electronic devices 674, 675, and 676 through the communication circuit. The information transmitted by each electronic device may include, for example, a residual amount of a battery of the electronic device, a charging mode thereof, the amount of wireless power received thereby, the amount of wireless power required thereby, IDentification (ID) information thereof, and the like. According to an example embodiment of the present disclosure, the electronic device may transmit location information thereof to the wireless power transmission device.

The wireless power transmission device may radiate an electromagnetic wave in order to detect an electronic device that receives wireless power. The method for detecting an electronic device by the wireless power transmission device has been described in detail, and thus, the description thereof will be omitted.

The wireless power transmission device may determine the locations and number of the electronic devices that receive wireless power based on the pieces of information received from the electronic devices, and may create cell antenna groups on the basis of the determined number of the electronic devices.

For example, the wireless power transmission device may receive pieces of ID information transmitted by the electronic devices 674, 675, and 676, and may determine that the number of electronic devices that receive wireless power is 3 on the basis of the received pieces of ID information.

When the number of the electronic devices has been determined, the wireless power transmission device may create groups based on the number of the electronic devices. For example, when the number of the electronic devices is 3, the wireless power transmission device may form multiple combinations of the multiple cells 601 to 664 included in the array antenna 600, and thereby may create three groups.

Also, the wireless power transmission device may receive pieces of wireless power reception-related information transmitted by the electronic devices, or information on the amount of power required by each of the electronic devices, and accordingly, may determine the number of cells included in each group. For example, when the magnitude of the amount of power required by each of the electronic devices 674, 675, and 676 is in order of the electronic device A 674>the electronic device B 675>the electronic device C 676, the wireless power transmission device may create the cell group A 671 for the electronic device A 674, may create the cell group B 672 for the electronic device B 675, and may create the cell group C 673 for the electronic device C 676. The group A 671 may be assigned 32 cells; and the radiated sub-RF waves may constructively interfere with each other by controlling at least one of the magnitude and phase of power which is input to the assigned cells, and thereby, a field which focuses on the electronic device A 674 may be generated. The group B 672 may be assigned 24 cells; and the radiated sub-RF waves may constructively interfere with each other by controlling at least one of the magnitude and phase of power which is input to the assigned cells, and thereby, a field which focuses on the electronic device B 675 may be generated. The group C 673 may be assigned 8 cells; and the radiated sub-RF waves may constructively interfere with each other by controlling at least one of the magnitude and phase of power which is input to the assigned cells, and thereby, a field which focuses on the electronic device C 676 may be generated.

The controller of the wireless power transmission device may configure a group in view of locations of cell antennas capable of transmitting power to the electronic device with the best efficiency. For example, when a group for transmitting wireless power to the electronic device A 674 is configured, the controller may select cells located near the electronic device A 674, namely, cells disposed at a left part of the array antenna, and may assign the selected cells to the cell group A 671.

Figure 7:
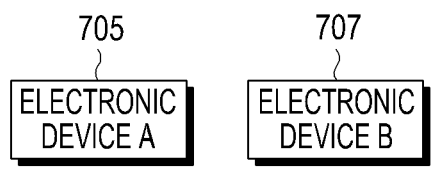
FIG. 7 is a diagram illustrating an example in which a wireless power transmission device detects a new electronic device while charging one electronic device and re-creates groups according to an example embodiment of the present disclosure.

FIG. 7 is a diagram illustrating an example in which a wireless power transmission device detects a new electronic device while charging one electronic device and re-creates groups according to an example embodiment of the present disclosure.

FIG. 7 illustrates the array antenna 600, an electronic device A 705, and an electronic device B 707. Here, a case where the electronic device B 707 is additionally detected while the electronic device A 705 is charged will be considered and described.

The array antenna 600 may include the multiple cells 601 to 664, and the number of the cells may, for example, and without limitation, be 64. The respective cells 601 to 664 may radiate sub-RF waves, and sub-RF waves correspond to wireless power.

When the wireless power transmission device detects and charges the electronic device 705, the wireless power transmission device may form a field, which focuses on the electronic device 705, by using sub-RF waves radiated by all the cells 601 to 664 forming the array antenna 600. That is, the wireless power transmission device may control at least one of a phase and an amplitude of wireless power radiated by all the cells 601 to 664 in such a manner that all the cells 601 to 664 form the field which focuses on the electronic device 705.

Thereafter, when the new electronic device B 707 is additionally detected, the wireless power transmission device may create a group A 701 and a group B 703 based on information transmitted by the electronic device A 705 and the electronic device B 707. For example, the information that the wireless power transmission device receives from the electronic devices 705 and 707 may include the amount of wireless power required by each of the electronic devices 705 and 707.

When power required by the electronic device A 705 is larger than power required by the electronic device B 707, the wireless power transmission device may assign more cells to the electronic device A 705 and may create the group A 701. For example, the group A 701 may include 40 cells, and the group B 703 may include 24 cells.

While the wireless power transmission device creates the group A 701 and the group B 703, in order to minimize and/or reduce an effect exerted on the attenuation and the like of charging power supplied to the electronic device A 705 already being charged, the wireless power transmission device may gradually change the phase and amplitude of an electromagnetic wave radiated by cells included in each of the created groups A 701 and B 703.

Also, the wireless power transmission device may determine situations, such as power received by each electronic device, an urgent request of each electronic device, and the like, may dissolve the group for charging the electronic device already being charged, and may stop the existing transmission of power; and then may reform a group, and may transmit wireless power to each of the electronic devices A 705 and B 707.

According to an example embodiment of the present disclosure, in order to uniformly maintain the amount of wireless power transmitted to the electronic device A 705 already being charged, the wireless power transmission device may increase the amount of power supplied to the multiple cells included in the group A 701.

For example, when the wireless power transmission device detects the new electronic device B 707 in a state of charging the electronic device A 705, the wireless power transmission device may combine the multiple cells, may create the groups A 701 and B 703, and may adjust the amount of power supplied to cells included in each of the groups A 701 and B 703.

Figure 8:
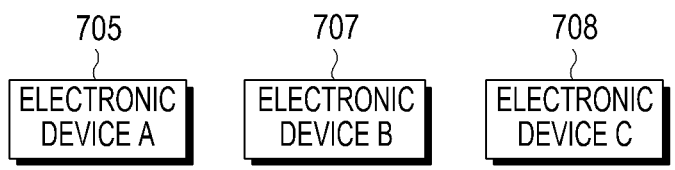
FIG. 8 is a diagram illustrating an example in which a wireless power transmission device detects another electronic device while charging two electronic devices and re-creates groups according to an example embodiment of the present disclosure.

FIG. 8 is a diagram illustrating an example in which a wireless power transmission device detects another electronic device while charging two electronic devices and re-creates groups according to an example embodiment of the present disclosure.

FIG. 8 illustrates the array antenna 600, the electronic device A 705, the electronic device B 707, and an electronic device C 708. Here, a case where the electronic device C 708 is additionally detected while the electronic device A 705 and the electronic device B 707 are charged will be considered and described.

The array antenna 600 may include the multiple cells 601 to 664. For example, the number of the cells may, for example, and without limitation, be 64. Each of the cells 601 to 664 may radiate a sub-RF wave, and sub-RF waves correspond to wireless power.

When an electronic device that receives wireless power is additionally detected, the wireless power transmission device may dissolve the existing groups, and may create new groups.

For example, when the wireless power transmission device detects and charges the two electronic devices 705 and 707, the wireless power transmission device may create the group A 701 and the group B 703 based on information transmitted by the electronic devices A 705 and B 707.

When the wireless power transmission device detects the new electronic device C 708 while charging the two electronic devices A 705 and B 707, the wireless power transmission device may dissolve the previously-created groups A 701 and B 703, may newly combine the cells, and may create new groups C 821, D 822, and E 823.

The wireless power transmission device may create the groups C 821, D 822, and E 823 based on information received from the electronic devices A 705, B 707, and C 708. The number of cells included in each group may be determined based on information received from the relevant electronic device. For example, the number of cells may be determined according to the amount of power required by the electronic device. A large number of cells are assigned when the electronic device requires a large amount of power, and a relatively small number of cells are assigned when the electronic device requires a small amount of power.

The wireless power transmission device may determine the number of cells included in the group, according to a charging mode of the electronic device. For example, when the electronic device A 705 is in a fast charging mode and the electronic device B 707 is in a normal charging mode, the wireless power transmission device may assign a relatively large number of cells to the group C 821 corresponding to the electronic device A 705. The type of the charging mode of the electronic device may be determined by a user, and accordingly, the wireless power transmission device may determine the number of cells included in a group on the basis of an input provided by the user, and may create the group by using the determined number of cells.

The wireless power transmission device may create a group based on residual-quantity information of the battery of the relevant electronic device. For example, the wireless power transmission device may create a group by assigning a smaller number of cells to an electronic device of which the residual amount of the battery is large than to an electronic device of which the residual amount of the battery is small. That is, the wireless power transmission device may transmit a larger amount of power to the electronic device per unit time, of which the residual amount of the battery is smaller, by assigning a larger number of cells to the electronic device. For example, when the residual amount of the battery of the electronic device B 707 is 30% and the residual amount of the battery of the electronic device C 708 is 80%, the wireless power transmission device assigns 24 cells to the group D 822, and assigns 8 cells to the group C 823.

The wireless power transmission device may create groups according to respective distances from the array antenna 600 to the electronic devices A 705, B 707, and C 708. For example, when consideration is given to a case where a distance from the array antenna 600 to the electronic device A 705 is 100 cm, when a distance from the array antenna 600 to the electronic device B 707 is 80 cm, and when a distance from the array antenna 600 to the electronic device C 708 is 70 cm, the wireless power transmission device may assign 32 cells to the group C 821 corresponding to the electronic device A 705, may assign 24 cells to the group D 822 corresponding to the electronic device B 707, and may assign 8 cells to the group E 823 corresponding to the electronic device C 708.

While the wireless power transmission device creates the new groups C 821, D 822, and E 823, the wireless power transmission device may control the phase and amplitude of wireless power, which is radiated by the cells, in such a manner as to gradually change the amount of the wireless power, and may radiate wireless power through cells included in each of the new groups C 821, D 822, and E 823. Accordingly, the wireless power transmission device may smoothly and continuously perform a charging operation through the cells included in each of the new groups without interrupting an operation of charging the electronic devices A 705 and B 707 already being charged.

Also, the wireless power transmission device may determine situations, such as power received by each electronic device, an urgent request of each electronic device, and the like, may dissolve the existing cell groups 701 and 703 for the electronic devices A 705 and B 707 already being charged, and may stop the existing transmission of power; and may then transmit wireless power to the electronic devices A 705, B 707, and C 708 through the newly-created cell groups 821, 822, and 823.

Examples of a scheme in which the wireless power transmission device supplies power to each cell may include a passive type and an active type.

When cells are dynamically assigned in the passive type, the wireless power transmission device applies identical power to each cell by using a power splitter. In this example, the width of a field may be changed based on the number and phase control angle of cells assigned to each group.

In the passive type, when another electronic device enters a charging area in a state where all the cells included in the array antenna supply power to one electronic device, the wireless power transmission device may equally divide the cells according to the number of the wireless power reception devices, and may create groups. When, as a result, sufficient power is not supplied to each electronic device, the wireless power transmission device may increase an output of a power amplifier thereof and may supply sufficient power to the cells. In other words, in the passive type, when identical power is supplied from the power amplifier, power supplied to the respective cells may be equally divided, and the amount of wireless power supplied to each electronic device may be changed according to the number of cells formed as a group.

Also, when another electronic device is added in this state, the wireless power transmission device may re-divide the cells. When the wireless power transmission device does not change power from the power amplifier, the amount of wireless power transmitted to the electronic device already being charged may be reduced by that of wireless power corresponding to the number of cells assigned to the added electronic device. In order to compensate for the reduced amount of wireless power, the wireless power transmission device may control the output of the power amplifier, and accordingly, a charging operation may not be stopped.

In the active type, the wireless power transmission device may individually control power from the respective cells. The wireless power transmission device may dynamically group the cells, may receive, from an electronic device that receives wireless power, information on the amount of wireless power received by the electronic device, and may control the amount of power of each cell. In the active type, when another electronic device enters a charging area in a situation where all the cells included in the array antenna supply power to one electronic device, the wireless power transmission device may equally divide the cells according to the number of the wireless power reception devices, and may create groups. When, as a result, sufficient power is not supplied to each electronic device, the wireless power transmission device may increase an output of a power amplifier thereof and may supply sufficient power to each of the cells. The amount of wireless power supplied to each electronic device may be changed according to the number of cells formed as a group.

Also, when another electronic device is added in this state, the wireless power transmission device may re-divide the cells. When the wireless power transmission device does not change power from the power amplifier, the amount of wireless power transmitted to the electronic device already being charged may be reduced by that of wireless power corresponding to the number of cells assigned to the added electronic device. In order to compensate for the reduced amount of wireless power, the wireless power transmission device may control the amount of power supplied to each cell, and accordingly, a charging operation may not be stopped.

When the number of electronic devices that receive wireless power is changed, the wireless power transmission device may determine charging priorities, and newly create groups according to the determined charging priorities. The priorities may be determined on the basis of pieces of information received from the electronic devices. Specifically, the priority may be determined according to the residual amount of the battery of the electronic device and whether a charging mode of the electronic device is a fast charging mode or a normal charging mode.

For example, when the wireless power transmission device detects a new electronic device while charging an electronic device, the wireless power transmission device may receive information from the newly-added electronic device, and may determine a priority between the electronic device already being charged and the newly-added electronic device, on the basis of the received information. When a charging mode of the newly-added electronic device is a fast charging mode, the wireless power transmission device may create groups so as to assign a larger number of cells to the newly-added electronic device, or may increase power supplied to cells included in the group.

Meanwhile, when the wireless power transmission device detects a new electronic device while charging the electronic device with substantially maximum power, the wireless power transmission device may receive information from the newly-added electronic device, may determine, on the basis of the received information, which electronic device has a priority between the electronic device currently being charged and the newly-added electronic device, and may create new groups according to the determined priority.

For example, when the wireless power transmission device detects the new electronic devices B 707 and C 708 while charging the electronic device A 705 with substantially maximum power, the wireless power transmission device may determine a priority among the electronic devices A 705, B 707, and C 708 on the basis of information received from the electronic devices A 705, B 707, and C 708. The wireless power transmission device may create the new groups 821, 822, and 823 according to the determined priority, or may determine a charging order of the electronic devices A 705, B 707, and C 708. When the priority is determined in order of the electronic device A 705>the electronic device B 707>the electronic device C 708, the wireless power transmission device may charge, first of all, the electronic device A 705, may complete the charging of the electronic device A 705, and may then create new groups in order to charge the electronic devices B 707 and C 708. For example, the wireless power transmission device may charge an electronic device having the highest charging priority, and may postpone the creation of new groups until the charging of the electronic device is completed.

Figure 9:
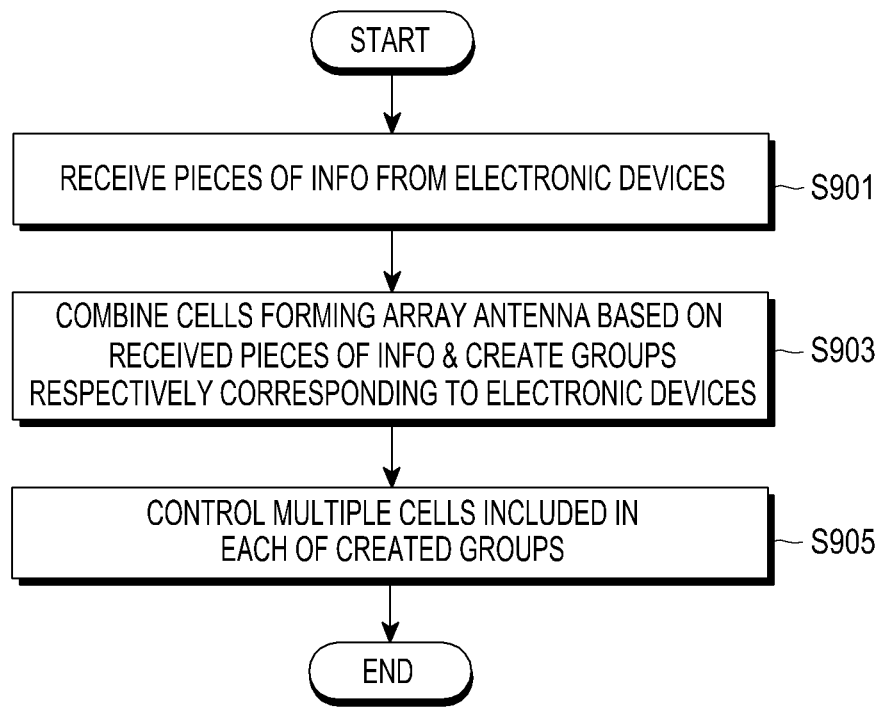
FIG. 9 is a flowchart illustrating an example method in which a wireless power transmission device combines cells included in an array antenna and creates groups according to electronic devices that receive wireless power, and controls each group according to an example embodiment of the present disclosure.

FIG. 9 is a flowchart illustrating an example method in which a wireless power transmission device combines cells included in an array antenna and creates groups according to electronic devices that receive wireless power, and controls each group according to an example embodiment of the present disclosure.

Referring to FIG. 9, in operation S901, the wireless power transmission device receives pieces of information from electronic devices. The information may include, for example, a residual amount of a battery of the electronic device, a charging mode thereof, the amount of wireless power received thereby, ID information thereof, and the like. The charging mode may be set according to a user input, and may be set to, for example, a fast charging mode or a normal charging mode. When an electronic device is set to be in the fast charging mode, the electronic device may be charged in a prioritized manner; and the wireless power transmission device may assign a group, which includes a relatively large number of cells, to the electronic device that is set to be in the fast charging mode, and thereby may transmit a larger amount of power.

In operation S903, the wireless power transmission device may combine cells forming the array antenna based on the received pieces of information, and may create groups respectively corresponding to the electronic devices.

The wireless power transmission device may control at least one of a phase and an amplitude of a sub-RF wave radiated by each of the cell antennas in such a manner that sub-RF waves constructively interfere with each other at the location of the electronic device, and thereby may form a beam oriented to the electronic device.

The wireless power transmission device may group the cells according to the direction and distance of the detected wireless power reception device. As described above, the wireless power transmission device may determine a direction and a distance of the wireless power reception device by using location information transmitted by the wireless power reception device, or by using the above-described method. When multiple wireless power reception devices are detected, the wireless power transmission device may combine the multiple cells forming the array antenna on the basis of a direction, in which each of the wireless power reception devices is located, and a distance within which each of the wireless power reception devices is located from the wireless power transmission device, and may form multiple groups respectively corresponding to the wireless power reception devices.

When multiple electronic devices are detected, the wireless power transmission device may group the cells of the array antenna into multiple groups, according to the number of the detected electronic devices. For example, when two electronic devices are detected, the wireless power transmission device may group the array antenna into two groups.

When the groups are created, in operation S905, the wireless power transmission device may control multiple cells included in each of the created groups. The wireless power transmission device may simultaneously and together control at least one of a phase and an amplitude of wireless power, which is radiated by cells included in an identical group, so as to be changed to a different phase or amplitude in such a manner that the cells form a beam oriented to the corresponding electronic device.

Figure 10:
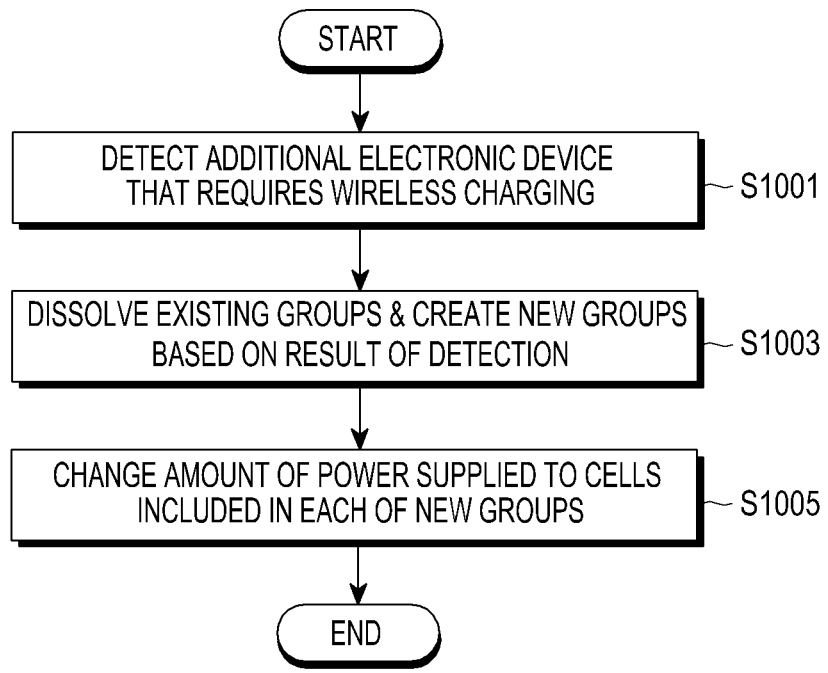
FIG. 10 is a flowchart illustrating an example method in which a wireless power transmission device additionally detects a new electronic device while wirelessly charging an electronic device and re-creates groups according to an example embodiment of the present disclosure.

FIG. 10 is a flowchart illustrating an example method in which a wireless power transmission device additionally detects a new second electronic device while wirelessly charging a first electronic device and re-creates groups of cells for transmitting power to the respective electronic devices according to an example embodiment of the present disclosure.

Referring to FIG. 10, in operation S1001, the wireless power transmission device additionally detects the second electronic device that requires charging, while performing an operation of wireless charging the first electronic device.

The method for detecting an electronic device by the wireless power transmission device has been described in detail, and thus, the description thereof will be omitted.

When the wireless power transmission device additionally detects the second electronic device, in operation S1003, the wireless power transmission device may dissolve the existing groups and may create new groups, based on a result of the detection. For example, when the wireless power transmission device detects a new third electronic device while the wireless power transmission device creates a group A and a group B and charges the first and second electronic devices, the wireless power transmission device may dissolve the groups A and B, and may create new groups C, D, and E to be assigned to the three electronic devices.

When the new groups are created, in operation S1005, the wireless power transmission device may change the amount of power supplied to cells included in each of the new groups.

For example, when the wireless power transmission device detects a new electronic device C and creates the groups C, D, and E while supplying the amount of power of 70 to the groups A and B, the wireless power transmission device may increase the amount of power to 100 with respect to the groups C, D, and E. Also, while the wireless power transmission device dissolves the existing groups and creates new groups, the wireless power transmission device may gradually change the phase and amplitude of an electromagnetic wave radiated by cells included in each of the new groups, and thereby may continuously supply wireless power.

Also, the wireless power transmission device may temporarily stop the supply of wireless power while dissolving the existing groups, and may resume the supply of wireless power while creating new groups.

Figure 11:
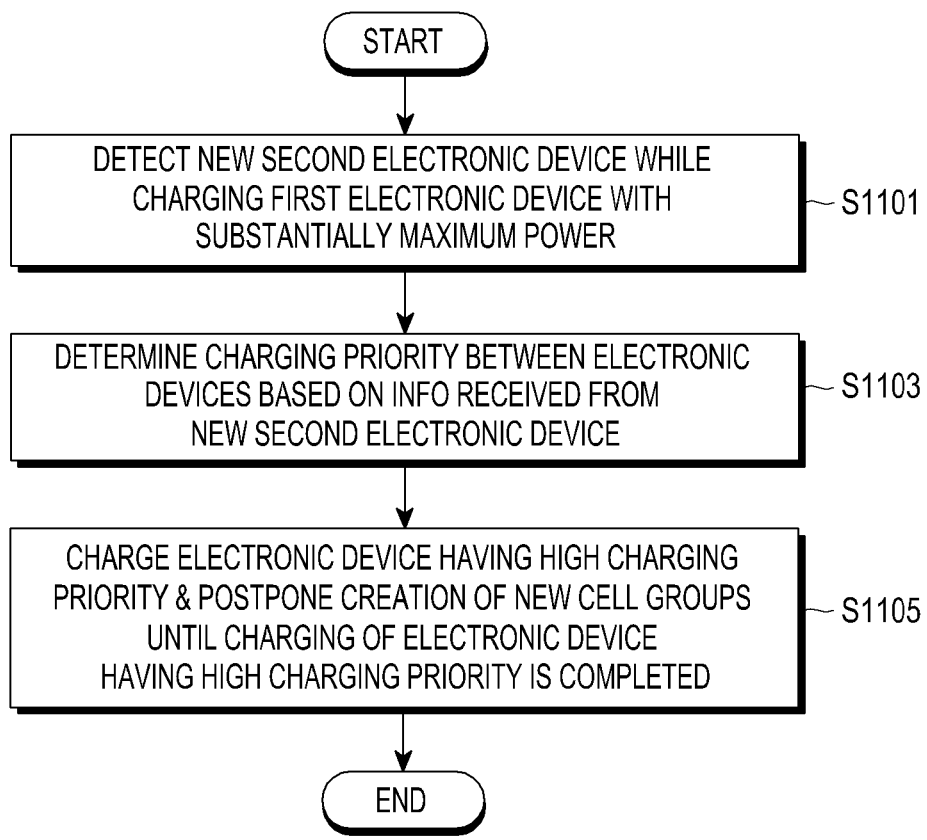
FIG. 11 is a flowchart illustrating an example method in which a wireless power transmission device determines a charging priority when detecting a new electronic device while charging an electronic device with substantially maximum and/or increased power according to an example embodiment of the present disclosure.

FIG. 11 is a flowchart illustrating an example method in which a wireless power transmission device determines a charging priority when detecting a new electronic device while charging an electronic device with substantially maximum power according to an example embodiment of the present disclosure.

Referring to FIG. 11, in operation S1101, the wireless power transmission device may detect a new second electronic device while charging a first electronic device with substantially maximum power, and may receive information, such as a charging mode and a residual amount of a battery, which is required for wireless charging. When the second electronic device has been detected, in operation S1103, the wireless power transmission device may determine a charging priority based on the information received from the detected second electronic device. For example, the charging priority may be determined based on the charging mode of each electronic device, the residual amount of the battery of thereof, and the like.

When the charging priority has been determined, in operation S1105, the wireless power transmission device may first charge the electronic device having a high charging priority, and may postpone the creation of new cell groups until the charging of the electronic device having the high charging priority is completed. For example, when the wireless power transmission device detects a new electronic device in a state where the electronic device currently being charged is being charged in a fast charging mode, the wireless power transmission device may postpone the creation of new cell groups until the charging of the electronic device currently being charged is completed.

Also, when the charging priority has been determined, the wireless power transmission device may create a cell group for charging an electronic device having a high charging priority and a cell group for charging an electronic device having a low charging priority, may transmit a larger amount of wireless power to the electronic device having the high charging priority, and may transmit a relatively small amount of wireless power to the electronic device having the low charging priority.

The charging priority may be determined by analyzing a residual amount of power of each electronic device that needs to receive power, a request of a user, and a pattern in which the user uses the electronic device.

The methods according to the various example embodiments disclosed in the present disclosure and the drawings may be implemented in the form of program instructions, which can be executed by various computer means, and may be recorded in a computer-readable medium. The computer-readable medium may include a program instruction, a data file, a data structure, and the like, alone or in a combination thereof. For example, the computer-readable medium may be stored in a volatile or non-volatile storage device such as a Read-Only Memory (ROM); a memory such as a Random Access Memory (RAM), a memory chip, a memory device or a memory integrated circuit; or a storage medium, such as a Compact Disc (CD), a Digital Versatile Disc (DVD), a magnetic disk or a magnetic tape, which is optically or magnetically recordable and simultaneously, is readable by a machine (e.g., a computer), regardless of whether the computer-readable medium can be deleted or rewritten.

It will be appreciated that the memory which may be included in the wireless power transmission device is an example of a machine-readable storage medium suitable for storing a program or programs including instructions for implementing the embodiments of the present disclosure. The program instructions recorded in the medium may be specially designed and configured for the present disclosure, or may be known to and used by those skilled in the art of computer software.

Meanwhile, the example embodiments disclosed in the present disclosure and the drawings are merely example embodiments provided to easily describe technical contents of the present disclosure and to aid in the understanding of the present disclosure, and are not intended to limit the scope of the present disclosure. Therefore, it should be understood that the scope of the present disclosure includes all modifications, alternatives and changes or modified and changed forms, which are derived based on the technical idea of the present disclosure, in addition to the example embodiments disclosed herein.

What is claimed is:

1. A wireless power transmission device comprising:
    a communication circuit;
    an array antenna comprising a plurality of cells; and
    a controller configured to:
    control the array antenna to transmit wireless power,
    receive information, from a plurality of electronic devices that receive the wireless power, through the communication circuit, the information including a charging mode of each of the plurality of electronic devices, the charging mode being a first charging mode with a first charging speed or a second charging mode with a second charging speed slower than the first charging speed,
    assign, based on the information, the plurality of cells to a plurality of groups including a first group and a second group, each group corresponding to different one of the plurality of electronic devices including a first electronic device and a second electronic device, wherein a number of at least one first cell assigned to the first group corresponding to the first electronic device which operates in the first charging mode is larger than a number of at least one second cell assigned to the second group corresponding to the second electronic device which operates in the second charging mode, and
    control the array antenna to transmit the wireless power to the plurality of electronic devices, based on the assignment of the plurality of cells to the plurality of groups.

2. The wireless power transmission device as claimed in claim 1, wherein the controller is further configured to:
    determine a location of each of the plurality of electronic devices that receive the wireless power, based on the received information which further includes the location of each of the plurality of electronic devices, and
    assign, based on the location of each of the plurality of electronic devices, the plurality of cells to the plurality of groups.

3. The wireless power transmission device as claimed in claim 1, wherein the controller is further configured to:
    determine a number of the plurality of electronic devices that receive the wireless power, based on the received information.

4. The wireless power transmission device as claimed in claim 1, wherein the information further comprises at least one of:
    an amount of the wireless power received by each of the plurality of electronic devices, or
    identification (ID) information of each of the electronic device.

5. The wireless power transmission device as claimed in claim 1, wherein the charging mode of each of the plurality of electronic devices is determined based on an input.

6. The wireless power transmission device as claimed in claim 1, wherein the controller is further configured to:
    control at least one of a phase and an amplitude of the wireless power transmitted by at least one cell included in each of the plurality of groups, wherein the at least one cell provides a field focusing on an electronic device corresponding to a group including the at least one cell.

7. The wireless power transmission device as claimed in claim 1, wherein each of the plurality of cells is assigned to one of the plurality of groups,
    wherein the controller is further configured to:
    after assigning the plurality of cells to the plurality of groups and receiving additional information from an additional electronic device, dissolve the plurality of groups and reassign, based on the information and the additional information, the plurality of cells to a new plurality of groups which respectively correspond to the plurality of electronic devices and the additional electronic device, wherein each of the plurality of cells is assigned to one of the new plurality of groups, and
    control the new plurality of groups to transmit the wireless power to the plurality of electronic devices and the additional electronic device.

8. The wireless power transmission device as claimed in claim 7, wherein each of the new plurality of groups corresponding to the plurality of electronic devices and the additional electronic device has a different combination of the assigned cells from a combination of the assigned cells in each of the plurality of groups corresponding to the plurality of electronic devices.

9. The wireless power transmission device as claimed in claim 1, wherein the controller is further configured to:
determine a charging priority among the plurality of electronic devices and a new electronic device further based on information received from the new electronic device, the new electronic device being detected while the wireless power transmission device charges the plurality of electronic devices with substantially maximum power.

10. The wireless power transmission device as claimed in claim 9, wherein the controller is further configured to:
charge an electronic device having a higher charging priority among the plurality of electronic devices and the new electronic device, and
postpone assignment of a new group until the charging of the electronic device having the higher charging priority is completed.

11. A method for transmitting wireless power by a wireless power transmission device comprising an array antenna comprising a plurality of cells, the method comprising:
controlling the array antenna to transmit wireless power;
receiving information from a plurality of electronic devices that receive the wireless power, the information including a charging mode of each of the plurality of electronic devices, the charging mode being a first charging mode with a first charging speed or a second charging mode with a second charging speed slower than the first charging speed;
assigning, based on the information, the plurality of cells to a plurality of groups including a first group and a second group, each group corresponding to different one of the plurality of electronic devices including a first electronic device and a second electronic device, wherein a number of at least one first cell assigned to the first group corresponding to the first electronic device which operates in the first charging mode is larger than a number of at least one second cell assigned to the second group corresponding to the second electronic device which operates in the second charging mode; and
controlling the array antenna to transmit the wireless power to the plurality of electronic devices, based on the assignment of the plurality of cells to the plurality of groups.

12. The method as claimed in claim 11, wherein the assigning of the plurality of cells comprises:
determining a location of each of the plurality of electronic devices that receive the wireless power, based on the received information which further includes the location of each of the plurality of electronic devices; and
assigning, based on the location of each of the plurality of electronic devices, the plurality of cells to the plurality of groups.

13. The method as claimed in claim 11, wherein the assigning of the plurality of cells further comprises:
determining a number of the plurality of electronic devices that receive the wireless power, based on the received information.

14. The method as claimed in claim 11, wherein the information further comprises at least one of:
an amount of the wireless power received by the each of the plurality of electronic devices, or
identification (ID) information of each of the plurality of electronic devices.

15. The method as claimed in claim 11, wherein the charging mode of each of the plurality of electronic devices is determined based on an input.

16. The method as claimed in claim 11, further comprising controlling at least one of a phase and an amplitude of the wireless power transmitted by at least one cell included in each of the plurality of groups wherein the at least one cell provides a field focusing on an electronic device corresponding to a group including the at least one cell.

17. The method as claimed in claim 11, wherein each of the plurality of cells is assigned to one of the plurality of groups,
wherein the method further comprises:
after assigning the plurality of cells to the plurality of groups and receiving additional information from an additional electronic device, dissolving the plurality of groups and reassigning, based on the information and the additional information, the plurality of cells to a new plurality of groups which respectively correspond to the plurality of electronic devices and the additional electronic device, wherein each of the plurality of cells is assigned to one of the new plurality of groups; and
controlling the new plurality of groups to transmit the wireless power to the plurality of electronic devices and the additional electronic device.

18. The method as claimed in claim 17, wherein each of the new plurality of groups corresponding to the plurality of electronic devices and the additional electronic device has a different combination of the assigned cells from a combination of the assigned cells in each of the plurality of groups corresponding to the plurality of electronic devices.

19. The method as claimed in claim 11, further comprising:
detecting a new electronic device while the wireless power transmission device charges the plurality of electronic device with substantially maximum power;
receiving information from the new electronic device; and
determining a charging priority among the plurality of electronic devices and the new electronic device further based on the received information from the new electronic device.

20. The method as claimed in claim 19, further comprising first charging an electronic device having a higher charging priority among the plurality of electronic device and the new electronic device, and postponing assignment of a new group until the charging of the electronic device having the higher charging priority is completed.

* * * * *